United States Patent
Jalil et al.

(10) Patent No.: US 8,224,340 B2
(45) Date of Patent: *Jul. 17, 2012

(54) METHOD AND APPARATUS TO ESTIMATE RELATIVE BASE STATION AND SUBSCRIBER TERMINAL LOCATIONS AND USING IT TO INCREASE FREQUENCY REUSE

(75) Inventors: Rehan Jalil, San Jose, CA (US); Mustafa Ergen, Oakland, CA (US)

(73) Assignee: WiChorus, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/772,929

(22) Filed: May 3, 2010

(65) Prior Publication Data

US 2010/0216463 A1 Aug. 26, 2010

Related U.S. Application Data

(63) Continuation of application No. 11/644,136, filed on Dec. 22, 2006, now Pat. No. 7,738,875.

(60) Provisional application No. 60/753,452, filed on Dec. 22, 2005.

(51) Int. Cl.
*H04W 40/00* (2009.01)

(52) U.S. Cl. ..... 455/447; 455/63.4; 455/63.2; 455/41.2; 455/500; 455/507; 455/509; 455/101; 370/338; 370/206; 370/277; 370/310; 370/328; 370/339; 370/334

(58) Field of Classification Search ............... 455/447, 455/63.4, 63.2, 41.2, 500, 507, 509, 101; 370/338, 206, 277, 310, 328, 339, 334
See application file for complete search history.

(56) References Cited

U.S. PATENT DOCUMENTS

| | | | | |
|---|---|---|---|---|
| 5,239,673 | A * | 8/1993 | Natarajan | 455/426.1 |
| 6,396,457 | B1 * | 5/2002 | Gatherer et al. | 343/853 |
| 6,433,740 | B1 * | 8/2002 | Gilhousen | 342/442 |
| 6,553,234 | B1 * | 4/2003 | Florea | 455/447 |
| 7,260,079 | B1 * | 8/2007 | Chapman et al. | 370/338 |
| 7,751,833 | B2 * | 7/2010 | Mansour et al. | 455/456.2 |
| 2003/0190920 | A1 * | 10/2003 | An | 455/456.1 |
| 2003/0214914 | A1 * | 11/2003 | Cain | 370/252 |
| 2005/0266802 | A1 * | 12/2005 | Wolf et al. | 455/67.11 |
| 2006/0292991 | A1 * | 12/2006 | Abramov et al. | 455/63.4 |

* cited by examiner

*Primary Examiner* — Rafael Pérez-Gutiérrez
*Assistant Examiner* — Lameka J. Kirk
(74) *Attorney, Agent, or Firm* — Hamilton, Brook, Smith & Reynolds, P.C.

(57) ABSTRACT

Method for estimating position information of base stations as well as terminals for three dimensional centralized real-time spectrum management to achieve high spectral efficiency. In one aspect of the invention, the method comprises i) understanding the position information of plurality of base stations, wherein the plurality of terminals and the base stations form a wireless network, ii) determining, at the central controller, position of a terminal via plurality of communication wirelessly between the base stations and a terminal and between the base station and the central controller, iii) applying network wide real time knowledge at the central controller to electronically steerable antennas to use a resource in a different direction then where it is used by other base stations to achieve frequency reuse of one.

15 Claims, 9 Drawing Sheets

METHOD AND APPARATUS TO ESTIMATE RELATIVE BASE STATION AND SUBSCRIBER TERMINAL LOCATIONS AND USING IT TO INCREASE FREQUENCY REUSE

STATEMENT OF RELATED APPLICATIONS

This application is a continuation of U.S. patent application Ser. No. 11/644,136, now U.S. Pat. No. 7,738,875, entitled "Method and Apparatus to Estimate Relative Base Station and Subscriber Terminal Locations and Using it to Increase Frequency Reuse", filed in the United States Patent and Trademark Office on Dec. 22, 2006, which claims the benefit to U.S. Provisional Application No. 60/753,452, filed in the United States Patent and Trademark Office on Dec. 22, 2005. The teachings of all patents, published applications, and references cited herein are incorporated by reference in their entirety herein.

SUMMARY OF THE INVENTION

In this invention, a method is proposed to find relative location of fixed base stations in the network; only distance information between some subscriber terminals and base stations are known if it is within the range. One part of the embodiment proposes a method to localize base stations. The method localizes base stations by selecting a base station as an origin of a local coordinate, and estimating possible positions of the base stations based on distance estimates reported by the terminals. Another embodiment of this invention proposes a method to locate terminals along with base stations. Final embodiment of this invention proposes a scheduling method in an OFDMA/TDMA/FDMA network in which there is a single channel which is used by all base stations. The scheduling method implements a scheduler in the base station to electronically steer the antennas of the base stations. Method achieves frequency reuse close to 1 by using a resource in a direction that does not conflict with others by the help of electronically steerable antennas and position information of the base stations and terminals. Further, the scheduler schedules a resource with respect to terminals bandwidth and informs other base stations not to schedule any resource in a contending direction. Furthermore, the scheduling method synchronizes all the base stations to transmit and receive frames in the same time and same frequency, whereby each of the base stations is aware of the scheduling in a neighboring base station in a way to reduce interference.

In another aspect, an apparatus for estimating a relative position of a base station and a terminal in a wireless network and using the relative position information to increase frequency reuse is disclosed. The apparatus includes a central controller, a plurality of terminals, at least three base stations, and the central controller is communicatively coupled with each terminal and base station in the wireless network using an OFDMA protocol. The terminals on entry into the wireless network estimate distance information by transmitting digital signals to the base stations using timing signals or power dissipation. Further, the central controller processes relative location information of base stations and terminals based on distance information transmitted by the terminals. Furthermore, the central controller includes means for coordinating a scheduler to increase the frequency of reuse by the base station and the terminals with electronically steerable antenna.

The method and system proposed in this invention can be generalized to three dimensional space in which base stations and terminals are placed in 3-D space.

BRIEF DESCRIPTION OF DRAWINGS

The objective of the present invention will be more apparent from the following detailed drawings, in which.

INTRODUCTION TO CERTAIN INVENTIVE PARTS OF INVENTION

Figure 1:
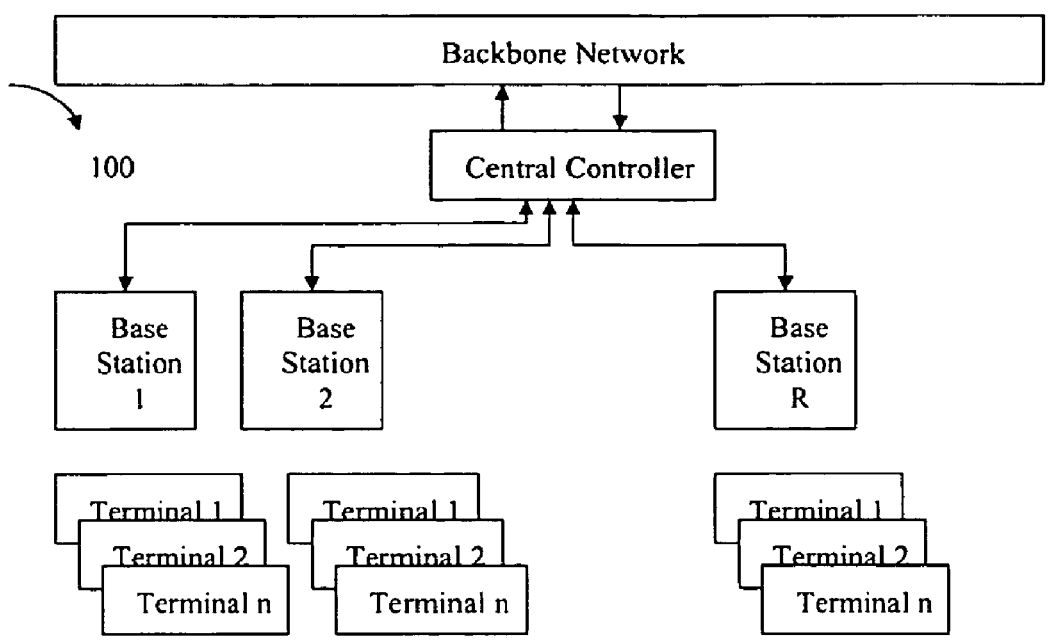
FIG. 1 illustrates the network diagram where there are mobile stations, base stations a central controller connected to IP backbone.

We consider a wireless network where there are plurality of terminals (Ts) and plurality of base stations (BSs) and central controller as seen in FIG. 1. Terminals can be mobile or fixed but base stations are fixed. We also consider a central controller that can do command control to BSs. A terminal in order to associate with a BS can scan multiple BSs at a given time without initiating an association in a typical network shown below.

Figure 2:
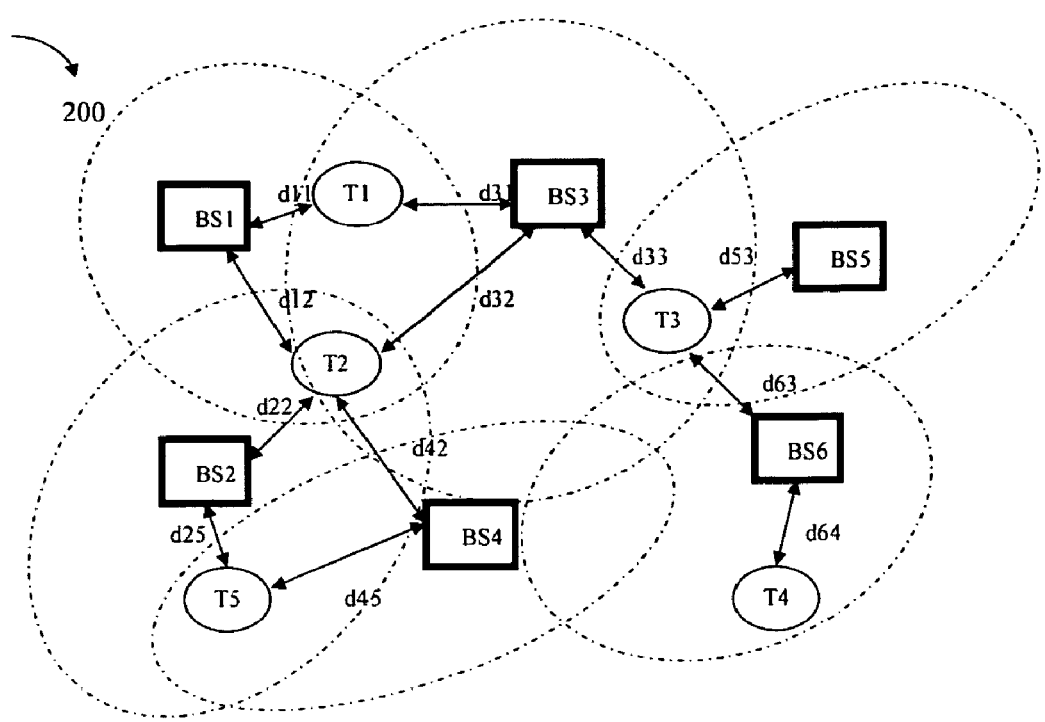
FIG. 2 depicts a scanning procedure where each mobile station range with a BS and estimate the distance from the ranging parameters.

A T first scans for the BS in the network entry procedure. In the scanning procedure the T can estimate its distance to a BS. As a result, after the network entry procedure a T has a set of distance estimates for the BSs that are in the vicinity of its range. Distance estimates can be done in various ways including RSSI based estimation, time of flight based estimation. FIG. 2 illustrates the network for scanning. This scanning report is sent to the central controller.

Based on the collected measurements, the central controller can construct the matrix (C) in Table I. Useful information in C is D matrix. One can see that there is no mechanism to estimate the distances between BSs and the distances between Ts and some distance estimates are censored between Ts and BSs because of the range limitations.

TABLE 1

Connectivity Matrix

| C | BS1 | B2 | BS3 | BS4 | BS5 | BS6 | T1 | T2 | T3 | T4 | T5 |
|---|---|---|---|---|---|---|---|---|---|---|---|
| BS1 | | | | | | | d11 | d21 | null | null | null |
| BS2 | | | | 0 | | | null | d22 | null | null | d25 |
| BS3 | | | | | | | d31 | d32 | d33 | null | null |
| BS4 | | | | | | | null | d42 | null | null | d45 |
| BS5 | | | | | | | null | null | d53 | null | null |
| BS6 | | | | | | | null | null | d63 | null | d64 |
| T1 | d11 | null | d31 | null | null | null | | | | | |
| T2 | d12 | d22 | d32 | d42 | null | null | | | 0 | | |
| T3 | null | null | d33 | null | d53 | d63 | | | | | |
| T4 | null | null | null | null | null | null | | | | | |
| T5 | null | null | null | d45 | null | d64 | | | | | |

D

Methodology for the Invention

For simplicity, we describe two-dimensional localization. However, our algorithm extends straightforwardly to three dimensions. We define a cluster as a set of four or more BSs, and a set of Ts such each Ts is connected to at least two of these BSs. A Ts is connected to a BS when it is in its communication range.

Figure 3:
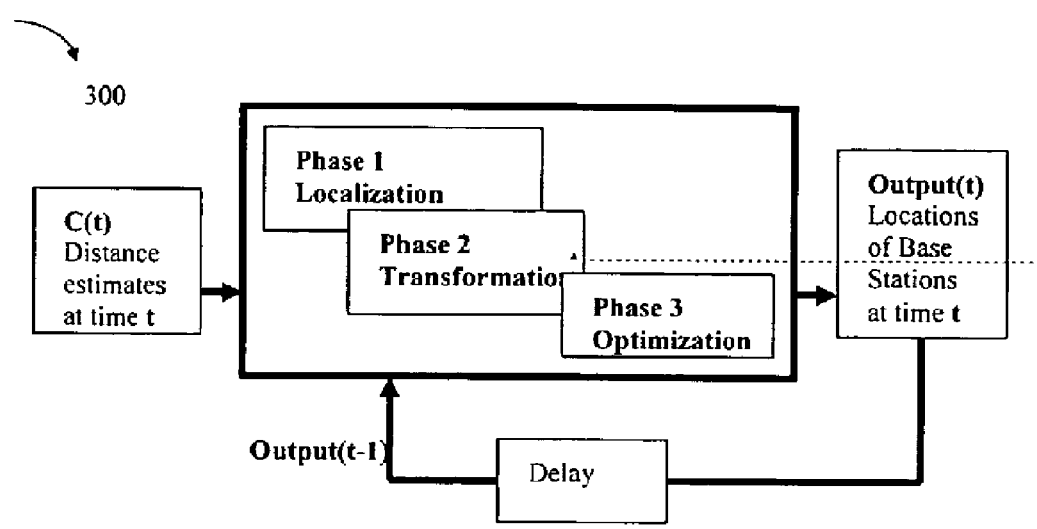
FIG. 3 shows the diagram of the method.

The algorithm can be broken down into three main phases. The first phase localizes the elements of clusters, BSs and Ts, into a local coordinate system. The second phase finds the relative positions among clusters and computes coordinate transformations between each cluster's local coordinate systems and generates a unique global coordinate system. The third phase refines the localization of the clusters using the periodical updates sent by, the Ts. An example is depicted in FIG. 3.

The three phases of the algorithm are as follows:

Phase I. Cluster Localization: A BS becomes the origin of the local coordinate system of a cluster and the algorithm estimates the relative location of the neighboring BSs which can be unambiguously localized. We call this process cluster localization. For each cluster, we identify the sets of possible positions of the BSs given the distance estimates reported by the Ts. The Ts and BSs's positions are jointly estimated. The figure below exemplifies the cluster localization for three base stations and five terminals.

Phase II. Cluster Transformation. The algorithm finds the set of BSs in common between two clusters. In the next step, the remaining BSs belonging to the two clusters are localized relative to the known positions using trilateration. Finally, the algorithm computes transformations between the local coordinate systems of neighboring clusters.

Phase III. Cluster Optimization. Refine the position estimates for each cluster using the periodical updates sent by Ts. This phase reduces and any accumulated error that results from the incremental approach used in the second phase.

Cluster Localization

The goal of cluster localization is to compute the position of a cluster of BSs and Ts in a local coordinate system up to a global rotation and possible reflection. The algorithm provides that the relative positions of the nodes in a cluster are unique up to a global rotation, translation, and reflection. Using this property any two clusters sharing three BSs form a larger cluster that is also globally rigid. By induction, any number of clusters chained in this manner forms a globally rigid graph.

The algorithm for Phase I, cluster localization, is as follows:

1. The central controller identifies a cluster of nc (nc>4) BSs. Given D, all the distance estimates dij involving to BSs in the cluster are selected. Let mc (<m) be the number of Ts connected to the mc BSs. This corresponds to performing rows and columns operations on D in order to find all the submatrices Dc of dimension mc×nc whose elements are not all different form zero. For simplicity, Ts with only one connectivity are neglected.

2. We define a relative coordinate system for the cluster, where BS1 is at the origin and MS1 is arbitrarily placed at location (Dcl 1,0).

3. Localizing BSs in clusters: the relative positions of the BSs in each cluster are estimated using uniquely the distance estimates in Dc. Algorithm 1 accomplishes this task. We define estMS$_j$ as the set of possible locations for MS$_j$, j=1, 2, . . . , mc that are consistent with Dc. Similarly, define estBS$_i$ as the set of possible locations for BS$_i$, i=1, 2, . . . , nc that are consistent with Dc. Algorithm 1 proceeds by progressively excluding from these sets points that are not consistent with the matrix Dc.

ALGORITHM 1

Localization within a cluster
set estBS $_1$=[0,0] and
estMS $_1$=[Dc11,0];
for all MS $_j$, j=2, ...mc
    If Dc $_{j0}$ not 'full'
    estMS $_j$ = circle([0,0], Dc $_{j0}$) j=2,...,mc
    estBS $_i$ = circle([Dc $_{11}$,0],Dc $_{ii}$) i=2,...,nc
for all BS $_i$
    delete (x,y) in estBS $_i$ inside circle([0,0], mindistBS)
    for all MS $_j$ such that Dc $_{ji}$ and Dc $_{ji}$ not 'null'
    delete (x,y) in estBS $_i$ outside circle([0,0], Dc $_{ji}$ +Dc $_{ji}$)
while localization iss complete
    for all BS j
    for all MS i
    delete points in estBSj and estMSi not consistent with Dc When the connectivity is high enough, the relative positions of the BSs are unique up to a global rotation, translation and reflection.

Figure 4:
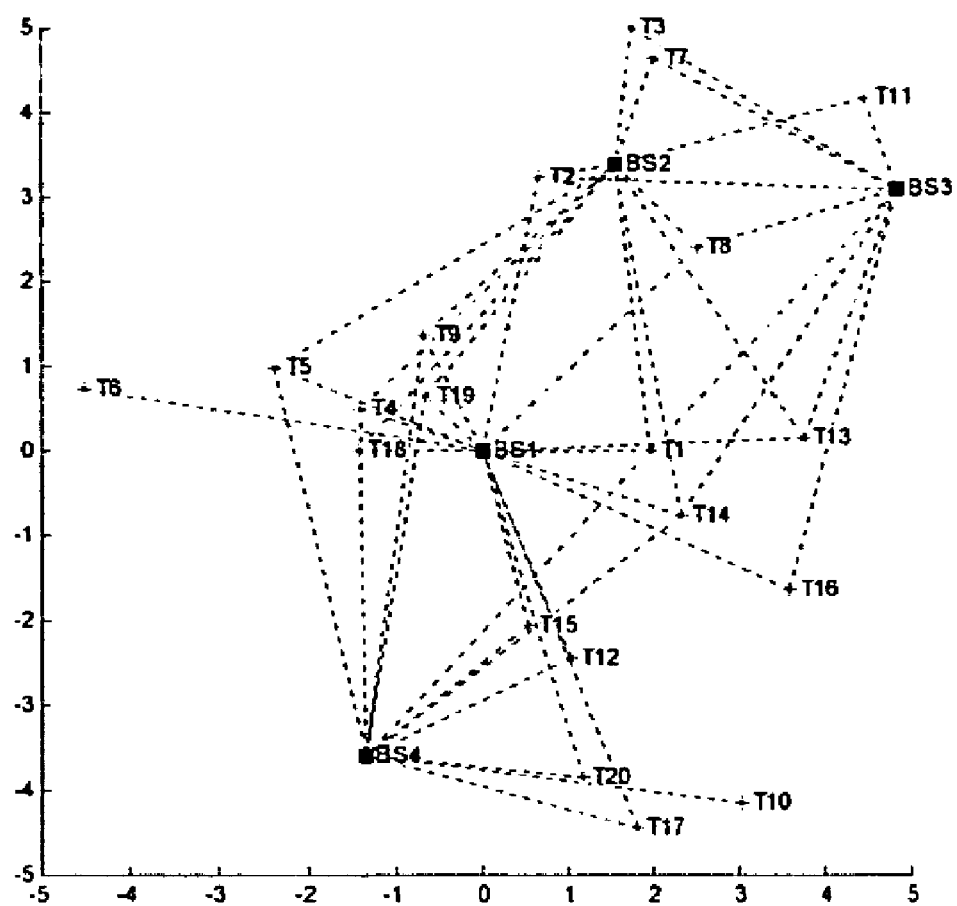
FIG. 4 shows the BS locationing with full distance information from MS.
Figure 5:
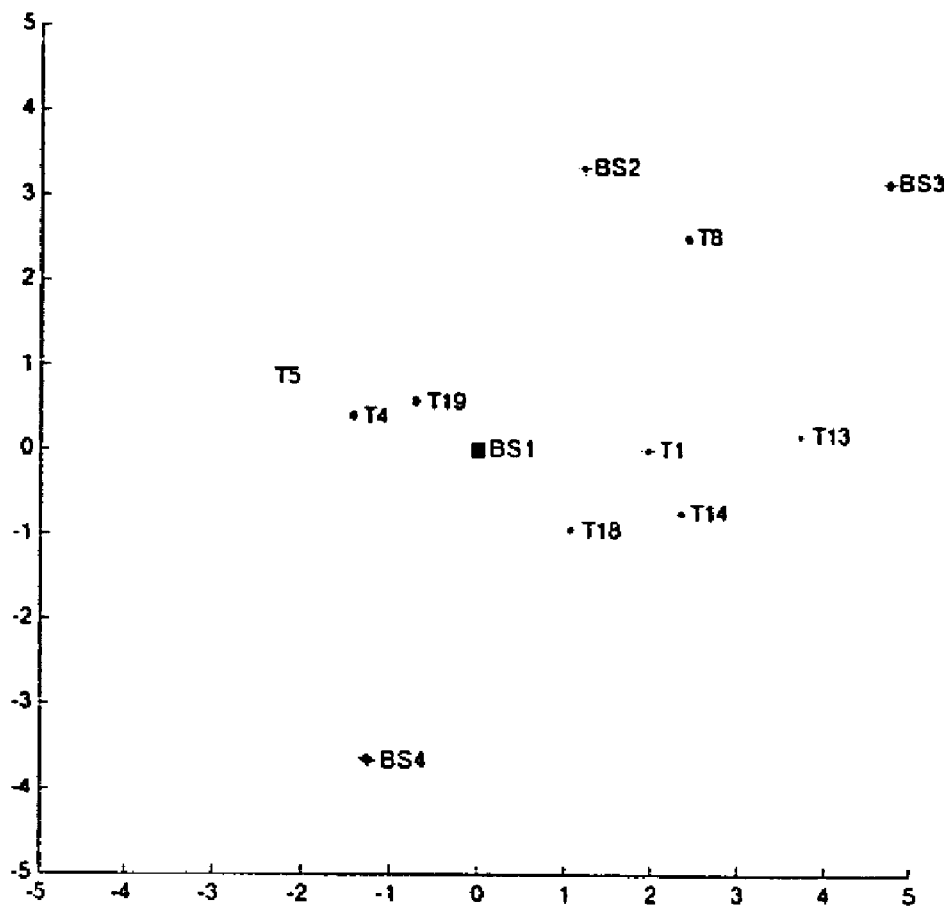
FIG. 5 illustrates a network deployment with three base stations and 19 terminals.

FIG. 4 shows an example of cluster with four BSs and twenty MSs. The dotted lines show the connections between BSs and MSs. FIG. 5 shows the output of Algorithm 1 when applied to this cluster. For simplicity, the relative location of the BSs are rotated and translated such that the algorithm's output can be compared with the original network.

Cluster Transformation

Figure 6:
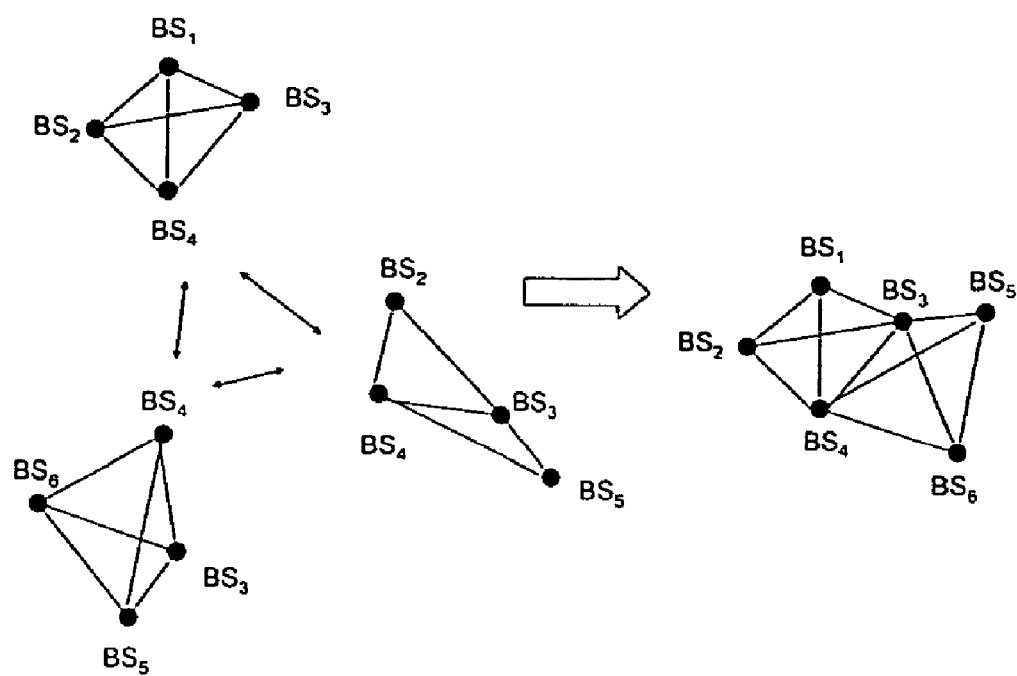
FIG. 6 illustrates a build-up mechanism to construct a map from partial information.

In Phase II, the algorithm localizes the relative positions among clusters by chaining together clusters as seen in FIG. 6. Whenever two clusters have three nodes in common, it is possible to localize the clusters relative to each other. If the first cluster is fully localized, we can localize the second cluster by trilaterating from the three known positions. The global network can be thought as a graph of clusters, and localization amounts to trilaterating overlapping graphs. This operation can be performed in linear-time.

Cluster Optimization

Distance updates periodically sent by Ts can be used to improve the localization performance of the previous two phases. As time goes on, the distance estimates for each graph increase. The central controller can store all the updates in a database, and Phase I and Phase II can be periodically re-computed with the updated information. Since the base station locations are fixed the computed output shall be fed as an input to do fine tuning.

Terminal Localization

Figure 7:
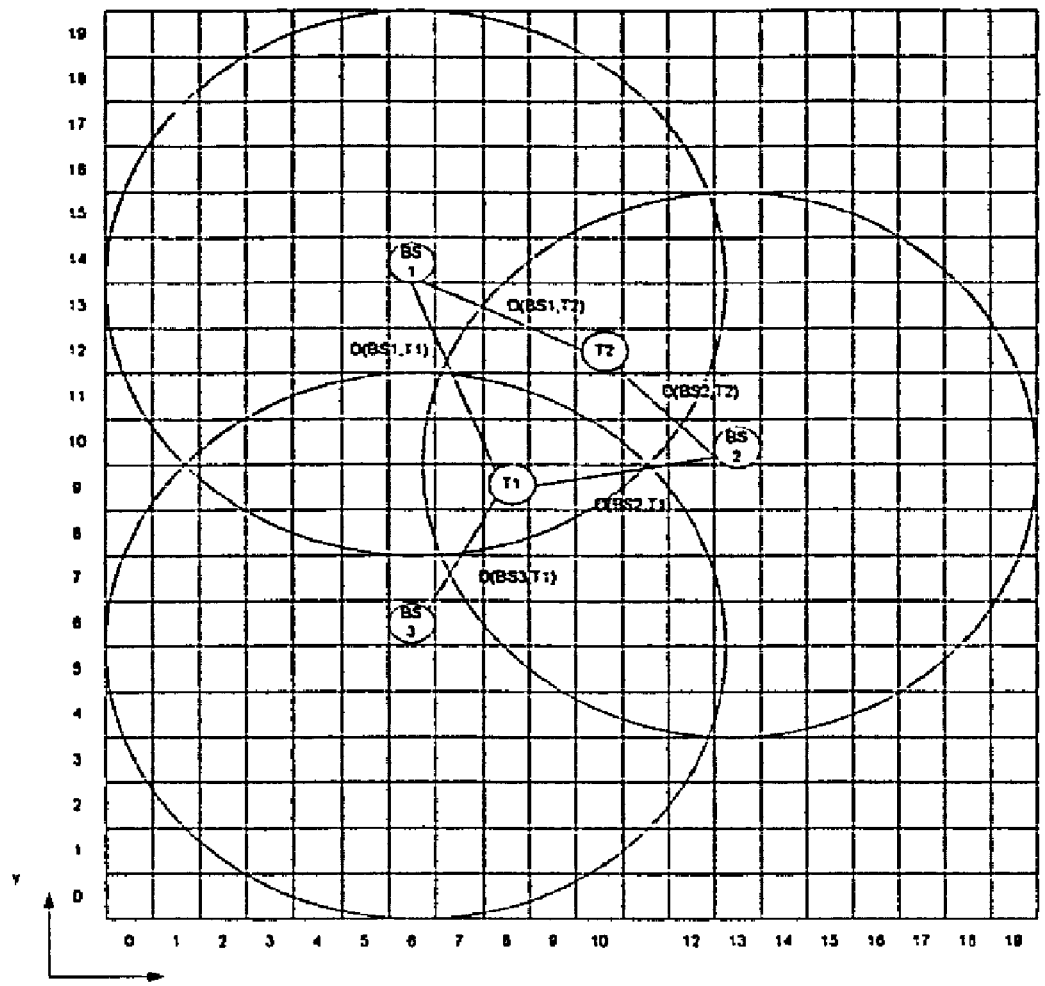
FIG. 7 illustrates the mechanism to locate the mobile stations.

Once the base station locations are fixed, then terminal's position can be found by triangulation. Terminals that have at least three estimates have enough information to find the location. FIG. 7 shows the examples of triangulation.

Figure 8:
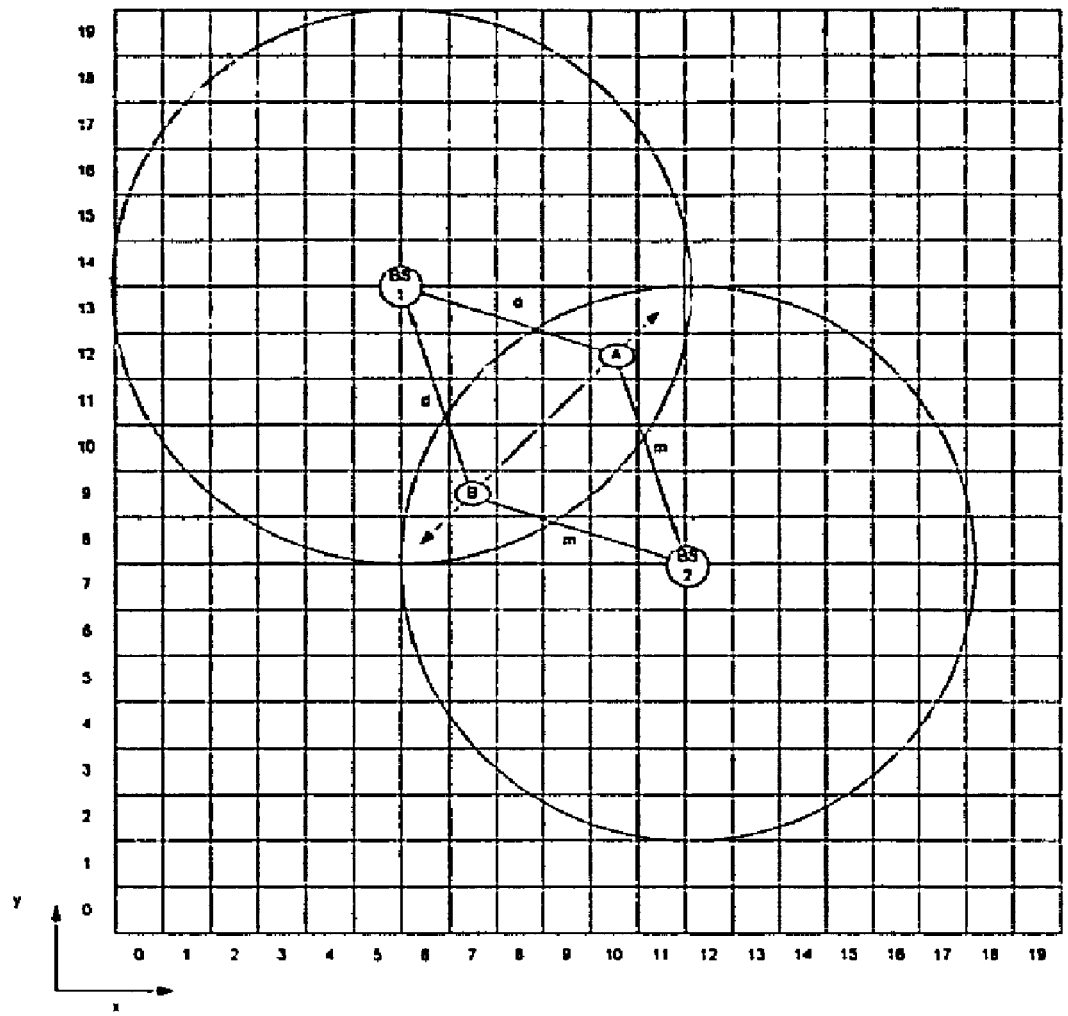
FIG. 8 illustrates the shadow point if there are only two distance estimates.

However, for terminal 2 in FIG. 7, there could be a shadow point as seen in FIG. 8. Location A and B cannot be differentiated by distance estimates but wireless signal conditions in a given area can be used to differentiate those two locations, also possibility of having those shadow points diminishes with the dense deployment of base stations. Mobility pattern of the terminal also brings side information to identify its location.

Frequency Reuse with Steerable Antenna Along with Locationing

In OFDMA/TDMA network, interference region between base stations can be avoidable by defining non-overlapping regions inside the given resource. A resource is considered as a collection of slots which are mapped into frequency and symbol axis. Non-overlapping regions can be constructed in the central controller via global knowledge of the topology to be assigned to different base stations which are sharing a terminal which is in the interference region of theirs. In this way, same resource can be used across the network by all base stations but they do use or blank out some regions according to the occupancy in their interference regions. In this way frequency reuse is close to unity.

When an electronically steerable antenna is available along with the locationing information of each terminal, frequency reuse of unity is achieved via single channel across network by directing non-overlapping resources to different terminals. If there is a conflicting node which is in the vicinity of BS1 and BS2. If BS1 uses a resource for that conflicting node, BS2 is allowed to use that resource only in a location different than the location of that conflicting node consequently which guarantees no interference with BS1's transmission. As a result, all resources are put to use but they are used with respect to geographical location of terminals.

Figure 9:
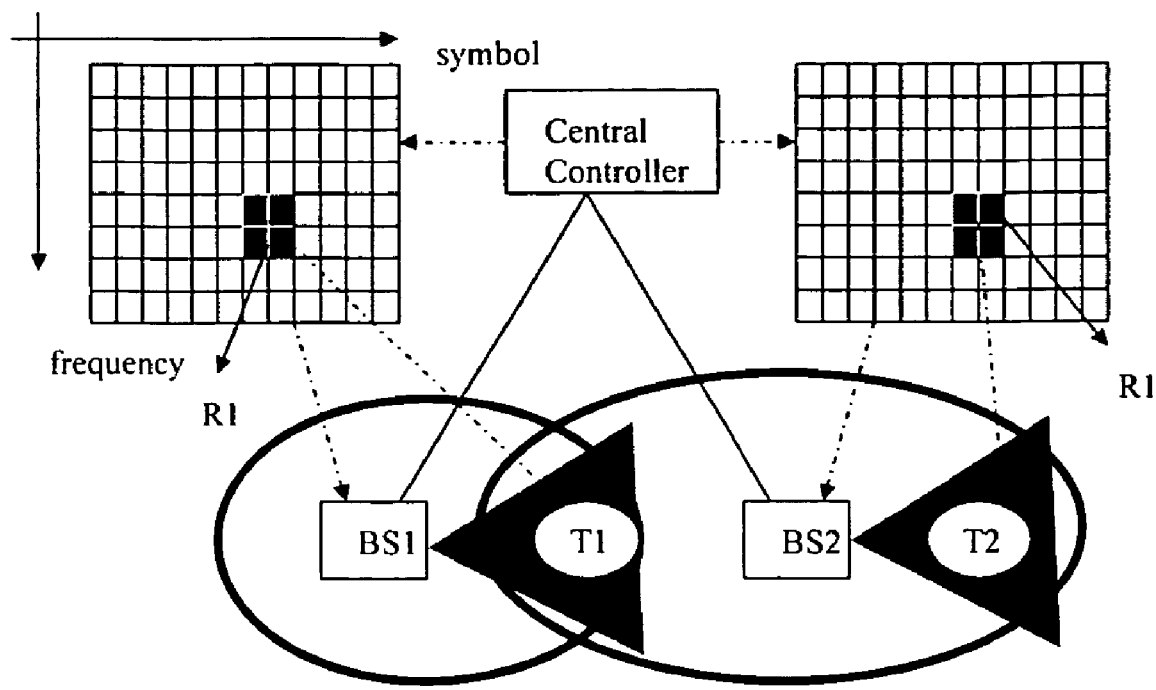
FIG. 9 illustrates the coordination of the central controller to provide location based scheduling with steerable antennas to increase the frequency reuse.

An example is shown in FIG. 9 where there are two base stations; Base station 1 assigns resource R 1 to terminal 1 and base station 2 uses R 1 in different direction which is guaranteed to be The description presented above only includes some but not all embodiments of the invention. Related other ways of managing three dimensional spectrum management to achieve high spectral efficiency may be devised without departing from the original scope of this invention, and are thus include by the present invention.

What is claimed is:

1. A method for finding locations of base stations and using location information of the base stations to increase frequency reuse in a wireless network, the method comprising:
    periodically scanning a plurality of terminals by each of the base stations on entry of the plurality of terminals into the wireless network by ways of transmitting digital signals from the base stations to the plurality of terminals;
    estimating respective distances from the plurality of terminals by each of the base stations using the transmitted digital signals;
    transmitting distance information, by at least one of the plurality of terminals, including the estimated distances to each of the base stations;
    storing and processing the distance information by each of the base stations;
    determining relative locations of the plurality of terminals with respect to the base stations using the stored and processed distance information; and
    electronically steering respective antennas of the base stations based on the determined relative locations of the plurality of terminals and the base stations to increase frequency reuse by a scheduler in each of at least one base station of the base stations.

2. The method of claim 1, wherein determining relative locations of the plurality of terminals with respect to the base stations includes cluster localizing, cluster transforming, and cluster optimizing.

3. The method of claim 2, wherein the cluster localizing includes selecting a base station of the base stations as an origin of a local coordinate, and estimating possible positions of the plurality of terminals based on the estimated distances.

4. The method of claim 2, further comprising using a smart scheduling at the base stations to increase frequency reuse.

5. The method of claim 2, wherein the scheduler schedules a resource with respect to terminals bandwidth.

6. The method of claim 5, wherein the base stations are synchronized to transmit and receive frames in the same time and same frequency, whereby the other base stations are aware of the scheduling in a neighboring base station in a way to reduce interference.

7. The method of claim 5, wherein the base stations are synchronized to transmit and receive frames in different time and same frequency, whereby the other base stations are aware of the scheduling in a neighboring base station in a way to reduce interference.

8. The method of claim 5, wherein the base stations are synchronized to transmit and receive frames in same time and different frequency, whereby the other base stations are aware of the scheduling in a neighboring base station in a way to reduce interference.

9. The method of claim 2 further comprising constructing and refining non-overlapping regions and interference regions for each of the base stations and the plurality of terminals based on the periodically determined relative locations of the plurality of terminals and the base stations.

10. The method of claim 9 further comprising scheduling a resource of a base station of the base stations based on the constructed and refined non-overlapping regions and interference regions.

11. An apparatus for finding locations of base stations and using location information of the base stations to increase frequency reuse in a wireless network, the apparatus comprising:
    a scanning module configured to scan a plurality of terminals on entry of the plurality of terminals into the wireless network by ways of transmitting digital signals to the plurality of terminals;
    an estimation module configured to estimate respective distances from the plurality of terminals using the transmitted digital signals;
    a transmission module configured to transmit distance information, by at least one of the plurality of terminals, including the periodically estimated distances to each of the base stations;
    a memory configured to store the distance information by each of the base stations on in the memory and process the distance information;
    a determination module configured to determine relative locations of the plurality of terminals with respect to the base stations using the stored and processed distance information; and
    a steering module configured to steer antennas electronically based on the determined relative locations of the plurality of terminals and the base stations to increase frequency reuse by a scheduler interacting with the processor.

12. The apparatus of claim 11, wherein determining relative locations of the plurality of terminals with respect to the base stations includes cluster localizing, cluster transforming, and cluster optimizing.

13. The apparatus of claim 12, wherein the processor is configured to instruct the scheduler to schedule a resource to increase frequency reuse.

14. The apparatus of claim 12, wherein the processor is configured to construct and refine non-overlapping regions and interference regions for each of the base stations and the plurality of terminals based on the periodically determined relative locations of the plurality of terminals and the base stations.

15. The apparatus of claim 14, wherein the processor is configured to instruct the scheduler to schedule a resource based on the constructed and refined non-overlapping regions and interference regions.

* * * * *